United States Patent
Jee et al.

(10) Patent No.: US 10,785,826 B2
(45) Date of Patent: Sep. 22, 2020

(54) METHOD OF ESTABLISHING A DIRECT CONNECTION BETWEEN A MOBILE DEVICE, AND AN IMAGE DISPLAY APPARATUS, AND METHOD THEREOF

(71) Applicant: SAMSUNG ELECTRONICS CO., LTD., Suwon-si (KR)

(72) Inventors: Ho-jeen Jee, Yongin-si (KR); Jae-un Kwon, Seoul (KR); Seung-seop Shim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 590 days.

(21) Appl. No.: 14/593,002

(22) Filed: Jan. 9, 2015

(65) Prior Publication Data

US 2015/0195147 A1    Jul. 9, 2015

(30) Foreign Application Priority Data

Jan. 9, 2014  (KR) .................. 10-2014-0002794

(51) Int. Cl.
  *H04L 12/24* (2006.01)
  *H04W 84/12* (2009.01)
  *H04W 76/23* (2018.01)

(52) U.S. Cl.
  CPC .......... *H04W 84/12* (2013.01); *H04W 76/23* (2018.02)

(58) Field of Classification Search
  CPC ..................... H04W 76/043; H04W 84/12
  See application file for complete search history.

(56) References Cited

U.S. PATENT DOCUMENTS 7,016,673 B2   3/2006 Reddy et al.
7,948,949 B2   5/2011 Bowen
(Continued)

FOREIGN PATENT DOCUMENTS

JP  2013-507028 A   2/2013
KR  10-0803862     2/2008
(Continued)

OTHER PUBLICATIONS

"WiFi alliance begins Tunneled Direct Link Setup certification, hopes to improve media streaming," Nov. 14, 2012, https://web.archive.org/web/20121114131034/http://www.engadget.com/2012/08/26/wifi-alliance-begins-tunneled-direct-link-setup-certification/.
*

(Continued)

*Primary Examiner* — Kieu D Vu
*Assistant Examiner* — Alvaro R Calderon, IV
(74) *Attorney, Agent, or Firm* — Staas & Halsey LLP

(57) ABSTRACT

A mobile device, a controlling method thereof, an image display apparatus, and a controlling method thereof are provided. The mobile device includes: a user interface (UI) configured to receive a user command to control the image display apparatus; a communication interface configured to provide a service according to the user command through an access point (AP) to which the image display apparatus is connected, and perform a direct connection operation with the image display apparatus in response to the service being provided; and a controller configured to control the communication interface to hand the service over to a direct channel connected to the image display apparatus in response to the direct connection operation being completed.

13 Claims, 7 Drawing Sheets

(56) References Cited

U.S. PATENT DOCUMENTS

| | | | | |
|---|---|---|---|---|
| 7,974,637 | B1* | 7/2011 | Taveniku | G06Q 10/0833 |
| | | | | 455/456.1 |
| 8,160,050 | B2* | 4/2012 | Lee | H04L 12/185 |
| | | | | 370/311 |
| 8,881,208 | B2* | 11/2014 | Park | H04N 21/4104 |
| | | | | 725/81 |
| 8,929,822 | B2 | 1/2015 | Jung et al. | |
| 9,258,755 | B1* | 2/2016 | Ramamurthy | H04W 36/14 |
| 9,258,768 | B2 | 2/2016 | Jung et al. | |
| 9,451,648 | B2* | 9/2016 | Kawakami | H04W 76/14 |
| 9,913,313 | B2 | 3/2018 | Jung et al. | |
| 10,485,046 | B2 | 11/2019 | Jung et al. | |
| 2004/0024871 | A1* | 2/2004 | Kitchin | H04W 28/00 |
| | | | | 709/225 |
| 2004/0039817 | A1* | 2/2004 | Lee | H04W 24/00 |
| | | | | 709/225 |
| 2005/0030930 | A1* | 2/2005 | Cho | H04W 40/00 |
| | | | | 370/338 |
| 2005/0165916 | A1* | 7/2005 | Cromer | H04W 76/025 |
| | | | | 709/220 |
| 2005/0286466 | A1* | 12/2005 | Tagg | H04L 12/2856 |
| | | | | 370/329 |
| 2006/0050729 | A1* | 3/2006 | Chen | H04W 88/00 |
| | | | | 370/450 |
| 2008/0064404 | A1* | 3/2008 | Zhang | H04W 36/08 |
| | | | | 455/436 |
| 2008/0075038 | A1* | 3/2008 | Jin | H04W 16/14 |
| | | | | 370/329 |
| 2009/0196173 | A1* | 8/2009 | Wang | H04W 72/0486 |
| | | | | 370/230 |
| 2010/0124196 | A1* | 5/2010 | Bonar | H04B 7/0689 |
| | | | | 370/329 |
| 2010/0169498 | A1 | 7/2010 | Palanki et al. | |
| 2010/0302958 | A1* | 12/2010 | Wietfeldt | H04W 76/025 |
| | | | | 370/252 |
| 2011/0069689 | A1 | 3/2011 | Grandhi et al. | |
| 2011/0082940 | A1 | 4/2011 | Montemurro et al. | |
| 2011/0321126 | A1* | 12/2011 | Maniatopoulos | H04W 12/06 |
| | | | | 726/3 |
| 2012/0008542 | A1* | 1/2012 | Koleszar | H04L 45/32 |
| | | | | 370/312 |
| 2012/0057697 | A1* | 3/2012 | Holtmanns | H04L 9/0838 |
| | | | | 380/42 |
| 2012/0084341 | A1* | 4/2012 | Mantri | H04M 3/42178 |
| | | | | 709/203 |
| 2012/0086563 | A1* | 4/2012 | Arling | G06F 3/0486 |
| | | | | 340/12.52 |
| 2012/0178380 | A1* | 7/2012 | Fleck | H04W 52/0274 |
| | | | | 455/69 |
| 2012/0179737 | A1* | 7/2012 | Baranov | H04W 76/14 |
| | | | | 709/201 |
| 2012/0184282 | A1* | 7/2012 | Malkamaki | H04W 48/14 |
| | | | | 455/450 |
| 2012/0208462 | A1* | 8/2012 | Lee | H04W 8/005 |
| | | | | 455/41.2 |
| 2012/0265913 | A1* | 10/2012 | Suumaki | H04W 4/08 |
| | | | | 710/303 |
| 2012/0314663 | A1* | 12/2012 | Dwivedi | H04L 1/1816 |
| | | | | 370/329 |
| 2012/0322379 | A1* | 12/2012 | Eun | H04M 1/7253 |
| | | | | 455/41.2 |
| 2013/0007817 | A1* | 1/2013 | Park | H04N 21/4104 |
| | | | | 725/81 |
| 2013/0010719 | A1* | 1/2013 | Shapira | H04W 72/082 |
| | | | | 370/329 |
| 2013/0016032 | A1* | 1/2013 | Margulis | G06F 1/266 |
| | | | | 345/2.3 |
| 2013/0036231 | A1* | 2/2013 | Suumaki | H04L 63/18 |
| | | | | 709/228 |
| 2013/0065627 | A1 | 3/2013 | Jung et al. | |
| 2013/0148162 | A1* | 6/2013 | Park | G06F 3/1296 |
| | | | | 358/1.15 |
| 2013/0150071 | A1* | 6/2013 | Hassan | H04W 72/044 |
| | | | | 455/454 |
| 2013/0201981 | A1* | 8/2013 | Niwa | H04W 88/06 |
| | | | | 370/338 |
| 2013/0204962 | A1* | 8/2013 | Estevez | H04N 7/185 |
| | | | | 709/217 |
| 2013/0231044 | A1* | 9/2013 | Wang | H04H 20/72 |
| | | | | 455/3.06 |
| 2013/0287011 | A1* | 10/2013 | Zhao | H04W 4/023 |
| | | | | 370/338 |
| 2013/0297810 | A1* | 11/2013 | Ho | H04W 76/023 |
| | | | | 709/228 |
| 2013/0309971 | A1* | 11/2013 | Kiukkonen | H04L 63/107 |
| | | | | 455/41.2 |
| 2014/0068719 | A1* | 3/2014 | Kiukkonen | H04W 12/08 |
| | | | | 726/4 |
| 2014/0073244 | A1* | 3/2014 | Ko | H04W 4/008 |
| | | | | 455/41.1 |
| 2014/0075523 | A1* | 3/2014 | Tuomaala | H04L 63/083 |
| | | | | 726/6 |
| 2014/0091987 | A1* | 4/2014 | Lee | H04L 65/00 |
| | | | | 345/2.3 |
| 2014/0118778 | A1* | 5/2014 | Lee | H04N 1/00127 |
| | | | | 358/1.15 |
| 2014/0119234 | A1* | 5/2014 | Kwon | H04W 76/025 |
| | | | | 370/254 |
| 2014/0185603 | A1* | 7/2014 | Kaippallimalil | H04W 12/08 |
| | | | | 370/338 |
| 2014/0226494 | A1* | 8/2014 | Kim | H04L 1/20 |
| | | | | 370/242 |
| 2014/0241187 | A1* | 8/2014 | Barkay | H04W 76/23 |
| | | | | 370/252 |
| 2014/0287690 | A1* | 9/2014 | Kim | H04W 48/14 |
| | | | | 455/41.3 |
| 2014/0321444 | A1* | 10/2014 | Klein | H04W 76/045 |
| | | | | 370/338 |
| 2014/0347433 | A1* | 11/2014 | Kafle | H04L 65/1069 |
| | | | | 348/14.02 |
| 2014/0358990 | A1* | 12/2014 | Huang | H04L 67/42 |
| | | | | 709/203 |
| 2015/0016417 | A1* | 1/2015 | Dees | G06F 1/1698 |
| | | | | 370/331 |
| 2015/0063339 | A1* | 3/2015 | Han | H04W 48/16 |
| | | | | 370/338 |
| 2015/0092736 | A1* | 4/2015 | Damodaran | H04W 72/1215 |
| | | | | 370/330 |
| 2015/0095510 | A1* | 4/2015 | Bhorkar | H04L 12/2805 |
| | | | | 709/231 |
| 2015/0103680 | A1* | 4/2015 | Anand | H04W 72/1231 |
| | | | | 370/252 |
| 2015/0105023 | A1 | 4/2015 | Jung et al. | |
| 2015/0139203 | A1* | 5/2015 | Miryala | H04W 28/0263 |
| | | | | 370/338 |
| 2015/0195686 | A1* | 7/2015 | Yu | H04W 4/08 |
| | | | | 370/338 |
| 2015/0282081 | A1* | 10/2015 | Oren | H04W 52/0219 |
| | | | | 455/574 |
| 2015/0296416 | A1* | 10/2015 | Lee | H04W 8/005 |
| | | | | 370/331 |
| 2016/0006837 | A1* | 1/2016 | Reynolds | H04W 84/18 |
| | | | | 709/203 |
| 2016/0080708 | A1* | 3/2016 | Urata | H04N 9/3147 |
| | | | | 348/744 |
| 2016/0088665 | A1* | 3/2016 | Kim | H04W 74/008 |
| | | | | 370/329 |
| 2016/0150011 | A1* | 5/2016 | Le Nerriec | H04N 21/234309 |
| | | | | 709/205 |
| 2016/0157289 | A1 | 6/2016 | Jung et al. | |
| 2016/0183282 | A1* | 6/2016 | Balaban | H04W 4/008 |
| | | | | 370/329 |
| 2016/0192588 | A1* | 7/2016 | Smith | A01D 46/005 |
| | | | | 56/10.2 B |
| 2016/0219329 | A1* | 7/2016 | Jee | H04N 21/4367 |
| 2016/0219423 | A1* | 7/2016 | Lee | H04W 8/005 |
| 2016/0241620 | A1* | 8/2016 | Zhu | H04W 40/18 |

(56) References Cited

U.S. PATENT DOCUMENTS

| | | | |
|---|---|---|---|
| 2016/0323456 A1* | 11/2016 | Bernsen | G06F 1/1632 |
| 2017/0048373 A1* | 2/2017 | Dees | H04L 12/2809 |
| 2018/0199392 A1 | 7/2018 | Jung et al. | |

FOREIGN PATENT DOCUMENTS

| | | |
|---|---|---|
| KR | 10-1023161 | 3/2011 |
| KR | 10-2013-0008069 | 1/2013 |
| KR | 10-2013-0027643 | 3/2013 |
| KR | 10-2013-0029236 | 3/2013 |
| WO | 2012/173423 | 12/2012 |

OTHER PUBLICATIONS

"Miracast," Nov. 13, 2013, https://web.archive.org/web/20131113190007/http://en.wikipedia.org/wiki/Miracast.*

"The ultimate guide of Galaxy S4 screen mirroring," Dec. 25, 2013, https://web.archive.org/web/20140101012257/http://allaboutgalaxys4.com/the-ultimate-guide-of-galaxy-s4-screen-mirroring/.*

"Wi-Fi Certified Miracast: Extending the Wi-Fi experience to seamless video display," Dec. 9, 2013, https://web.archive.org/web/20131209120304/https://www.wi-fi.org/sites/default/files/uploads/wp_Miracast_Industry_20120919.pdf.*

"Wi-Fi Direct," Dec. 29, 2013, https://web.archive.org/web/20131229053731/https://www.wi-fi.org/discover-wi-fi/wi-fi-direct.*

"Wi-Fi Certified Miracast," Dec. 30, 2013, https://web.archive.org/web/20131230021514/http://www.wi-fi.org:80/discover-wi-fi/wi-fi-certified-miracast.*

"Can WiFi direct and WiFi station work simultaneously?," Jul. 31, 2013, https://web.archive.org/web/20130731103309/https://stackoverflow.com/questions/15540884/can-wifi-direct-and-wifi-station-work-simultaneously.*

"Instruction Manual for Android EZCast Universal WiFi Display Adapter," Oct. 20, 2013, http://www.ezcast-wifidisplay.com/manual/EZCast-manual-for-Andorid.pdf.*

"EZCast 4K Dongle," Jul. 8, 2010, http://www.iezvu.com/download/EZCast-4k-manual.pdf.*

"Instruction Manual for iOS EZCast Universal WiFi Display Adapter," Oct. 20, 2013, http://www.ezcast- wifidisplay.com/manual/EZCast-manual-for-ios.pdf.*

"How Wi-Fi Direct Works as a Gateway to the Internet of Things," Rowinski, D., Dec. 7, 2013, https://web.archive.org/web/20131207220209/https://readwrite.com/2013/09/10/what-is-wi-fi-direct/.*

"Wi-Fi Direct adds Peer-to-Peer Capabilities to Ubiquitous Wireless Network Technology," Wright, M., May 20, 2011, https://www.digikey.com/en/articles/techzone/2011/may/wi-fi-direct-adds-peer-to-peer-capabilities-to-ubiquitous-wireless-network-technology.*

"Wi-Fi Certified TDLS," Aug. 8, 2012, https://www.wi-fi.org/download.php?file=/sites/default/files/private/20120808_TDLS_White_Paper_FINAL_0.pdf.*

Korean Office Action dated Sep. 19, 2019 in Korean Patent Application No. 10-2014-0002794.

* cited by examiner

METHOD OF ESTABLISHING A DIRECT CONNECTION BETWEEN A MOBILE DEVICE, AND AN IMAGE DISPLAY APPARATUS, AND METHOD THEREOF

CROSS-REFERENCE TO RELATED APPLICATIONS

This application claims priority benefit from Korean Patent Application No. 10-2014-0002794, filed on Jan. 9, 2014, in the Korean Intellectual Property Office, the disclosure of which is incorporated herein by reference in its entirety.

BACKGROUND

1. Field

The present general inventive concept generally relates to providing a mobile device, a controlling method thereof, an image display apparatus, and a controlling method thereof, and more particularly, to providing a mobile device that reduces a start time of a service according to a direct connection between an existing image display apparatus and the mobile device, a controlling method thereof, an image display apparatus, and a driving method thereof.

2. Description of the Related Art

A Wi-Fi Peer to Peer (P2P) technology that has been proposed by the Wi-Fi Alliance provides compatibility with existing Wi-Fi and provides a function of directly connecting apparatuses providing Wi-Fi functions to each other in order to allow the apparatuses to communicate with each other without an access point (AP). The direct communication function between the apparatuses may be similar to a function provided by a technology such as Bluetooth. However, since the Wi-Fi P2P technology provides a wider transmission range and a higher data transmission speed than Bluetooth, a Wi-Fi P2P function has replaced Bluetooth at a high speed. For example, Bluetooth Version 4.0 that is the latest Bluetooth standard supports a maximum transmission range of about 100 m and a maximum transmission speed of about 24 Mbps, but a Wi-Fi direct supports a maximum transmission range of about 200 m and a maximum transmission speed of about 300 Mbps. However, a maximum transmission range of the Wi-Fi direct is not limited thereto. For example, the maximum transmission range may be available range that any new version of the Wi-Fi direct provides.

In case of wireless communication using existing Wi-Fi, a method of supporting a direct connection called an Ad-hoc mode exists. The Ad-hoc mode has actually hardly been used due to its limitation such as security fragility, an increase in power consumption, a limited transmission bandwidth of about 11 Mbps, etc.

The Wi-Fi direct has attract attention due to this. However, an existing Wi-Fi P2P group generation includes three processes, i.e., a device discovery, a service discovery, and a group generation, and thus a large amount of time is required to execute a Wi-Fi P2P function.

In more detail, a Wi-Fi direct connection process, an IP allocation process, and a real-time streaming protocol (RTSP) session opening process are sequentially executed to open a connection. Among these processes, the Wi-Fi direct connection process requires time to perform the processes, and may be several seconds for a device discovery and a device connection, for example, a time between about 8 seconds and 9 seconds. Also, the IP allocation process requires several seconds due to a characteristic of a dynamic host configuration protocol (DHCP). Therefore, a user may wait for a substantial amount of time from a time when a service is requested to a time when the service is ended.

SUMMARY

Additional aspects and/or advantages will be set forth in part in the description which follows and, in part, will be apparent from the description, or may be learned by practice of the disclosure.

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a mobile device that reduces a start time of a service according to a direct connection between an existing image display apparatus and the mobile device, a controlling method thereof, an image display apparatus, and a controlling method thereof.

According to an aspect of the exemplary embodiments, there is provided a mobile device to control an image display apparatus. The mobile device may include: a user interface (UI) unit configured to receive a user command to control the image display apparatus; a communication interface unit configured to provide a service according to the user command through an access point (AP) to which the image display apparatus is connected, and perform a direct connection operation with the image display apparatus in response to the service being provided; and a controller configured to control the communication interface unit to hand the service over to a direct channel connected to the image display apparatus in response to the direct connection operation being completed.

The UI unit may include a display unit configured to receive the user command according to a screen touch method. The controller may control the display unit to perform a screen mirroring operation of the mobile device through the image display apparatus.

The communication interface unit may include: a wireless local area network (WLAN) module configured to perform a WLAN communication with the AP; and a Wi-Fi direct module configured to perform a Wi-Fi direct communication with the image display apparatus.

The communication interface unit may further include: a switching unit configured to select at least one of the WLAN module and the Wi-Fi direct module under control of the controller.

The controller may communicate with the AP to determine whether the image display apparatus is connected to the AP, provide the service according to the determination result, and additionally determine whether the direct connection operation is completed, to perform the handover according to the determination result.

According to another aspect of the exemplary embodiments, there is provided an image display apparatus controlled by a mobile device. The image display apparatus may include: a communication interface unit configured to receive a service through an AP, to which the image display apparatus is connected, under control of the mobile device and perform a direct connection operation with the mobile device in response to the service being received; and a controller configured to control the communication interface unit to receive the service through a direct channel connected to the mobile device according to a handover of the mobile device in response to the direct connection operation being completed.

The image display apparatus may further include: a display unit configured to display an image signal related to the service on a screen. The controller may control the display unit to perform a screen mirroring operation of the mobile device through the image display apparatus.

The communication interface unit may include: a WLAN module configured to perform a WLAN communication with the AP; and a Wi-Fi direct module configured to perform a Wi-Fi direct communication with the mobile device.

The communication interface unit may further include: a switching unit configured to select at least one of the WLAN module and the Wi-Fi direct module under control of the controller.

According to another aspect of the exemplary embodiments, there is provided a method of controlling a mobile device controlling an image display apparatus. The method may include: receiving a user command to control the image display apparatus; providing a service to the image display apparatus through an AP, to which the image display apparatus is connected, according to the user command; performing a direct connection operation with the image display apparatus in response to the service being provided; and performing a handover to a direct channel connected to the image display apparatus to continuously provide the service in response to be direct connection operation being completed.

The user command may include a screen touch type command and a command to control the image display apparatus to perform a screen mirroring operation of the mobile device.

The AP may perform a WLAN communication with the mobile device and the image display apparatus, and the mobile device may perform a Wi-Fi direct communication with the image display apparatus.

The providing of the service to the image display apparatus may include: performing a communication with the AP to determine whether the image display apparatus is connected to the AP. The service may be provided according to the determination result.

The continuously providing of the service may include: determining whether the direct connection operation is completed. The handover may be performed according to the determination result.

According to another aspect of the exemplary embodiments, there is provided a method of controlling an image display apparatus controlled by a mobile device. The method may include: receiving a service through an AP, to which the image display apparatus is connected, under control of the mobile device; performing a direct connection operation with the mobile device in response to the service being received; and continuously receiving the service through a direct channel connected to the mobile device according to a handover of the mobile device in response to the direct connection operation being completed.

The method may further include: displaying an image signal related to the service on a screen. The control may control the image display apparatus to perform a screen mirroring operation of the mobile device.

The AP may perform a WLAN communication with the mobile device and the image display apparatus, and the image display apparatus may perform a Wi-Fi direct communication with the mobile device.

BRIEF DESCRIPTION OF THE DRAWINGS

These and/or other aspects and advantages will become apparent and more readily appreciated from the following description of embodiments, taken in conjunction with the accompanying drawings of which.

The above features present moreby describing in detail preferred thereof with reference to attached The above and/or other aspects will be more apparent by describing certain exemplary embodiments with reference to the accompanying drawings, in which.

DETAILED DESCRIPTION

Figure 1:
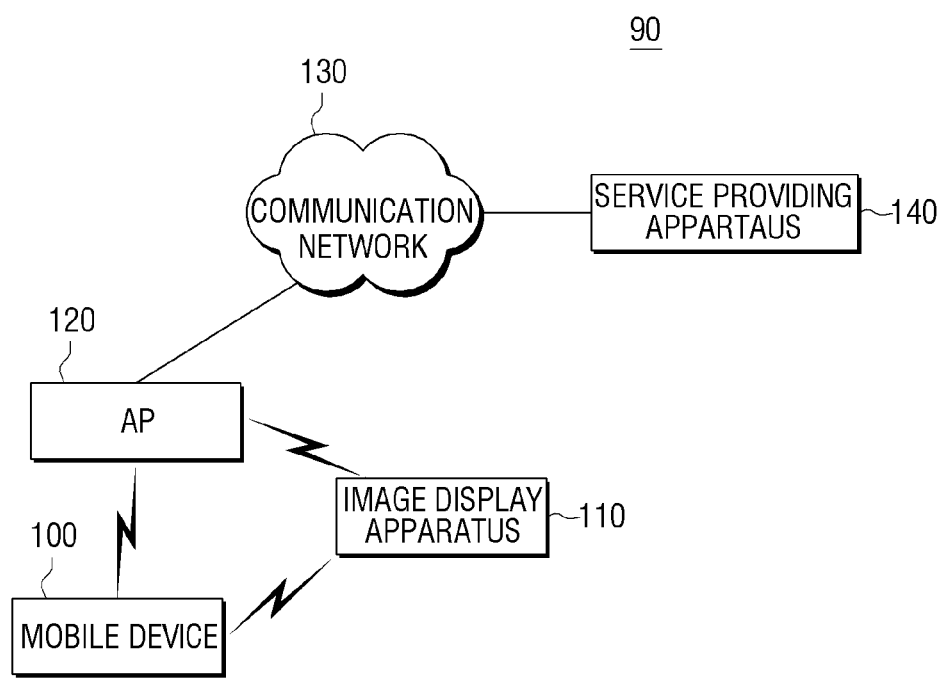
FIG. 1 is a view illustrating a P2P system using a handover according to an exemplary embodiment of the present general inventive concept.

Exemplary embodiments are described in greater detail with reference to the accompanying drawings.

In the following description, the same drawing reference numerals are used for the same components even in different drawings. The matters defined in the description, such as detailed construction and components, are provided to assist in a comprehensive understanding of the exemplary embodiments. Thus, it is apparent that the exemplary embodiments may be carried out without those specifically defined matters. Also, well-known functions or constructions are not described in detail since they would obscure the exemplary embodiments with unnecessary detail.

FIG. 1 is a view illustrating a P2P system 90 using a handover, according to an exemplary embodiment of the present general inventive concept.

Referring to FIG. 1, the P2P system 90 includes some or all of a mobile device 100, an image display apparatus 110, an access point (AP) 120, a communication network 130, and a service providing apparatus 140.

For example, the P2P system 90 may not include the communication network 130 and/or the service providing apparatus 140. However, for sufficient understanding of the present general inventive concept, all of the components will be described as being included.

The mobile device (or the image display apparatus) 100 may be a portable phone such as a smartphone or the like, a notebook personal computer (PC), a tablet PC, a personal digital assistant (PDA), or the like. In the present exemplary embodiment, since the mobile device 100 provides an image signal to the image display apparatus 110, the mobile device 100 may be referred to as a source device. Here, the image signal may include video and/or audio signals. The mobile device 100 may use a basic communication service, such as voice and data communications, and a multimedia service and thus may be provided with multimedia contents. The mobile device 100 may play an internal multimedia content or may request the image display apparatus 110 to play the internal multimedia content. For this, the mobile device 100 may access a peripheral small base station, i.e., the AP 120, through a wireless local area network (WLAN) to be provided with and provide a service. Here, in the present exemplary embodiment, a Wi-Fi communication may be used as a short-range wireless communication.

According to an exemplary embodiment of the present general inventive concept, if a user requests the image display apparatus 110 to perform a screen mirroring operation, the mobile device 100 tries to perform the screen mirroring operation through the AP 120 prior to performing of a direct connection requiring several seconds for a connection to the image display apparatus 110, in order to perform the screen mirroring operation. For this, the mobile device 100 performs a short-range wireless communication with the AP 120 to determine whether the image display apparatus 110 is connected to the AP 120. If the image display apparatus 110 is connected to the AP 120, the mobile device 100 communicates with the image display apparatus 110 through the AP 120 to control the screen mirroring operation. In other words, the image display apparatus 110 performs the screen mirroring operation of the mobile device 100. In this process, the mobile device 100 may receive information about a current channel (or an operation channel), through which the image display apparatus 100 is connected to the AP 120, from the AP 120 and check the information to perform a communication. Here, the information about the current channel may be included in a beacon signal of the AP 120.

If the image display apparatus (or the mobile device) 110 is connected to the AP 120, the mobile device 100 may start a service requested by the user through the AP 120 to reduce a service providing time which is more than a service providing time when the mobile device 100 starts a service through a direct connection to the image display apparatus 110. For example, a time between about 8 seconds and about 9 seconds is required to provide a service through a direct connection, and several seconds are required to allocate an Internet protocol (IP) by using a protocol such as a dynamic host configuration protocol (DHCP) or the like. The current channel is opened between the mobile device 100 and the image display apparatus 110 through the AP 120, and thus a time may be reduced by several seconds. A start time of the service using the AP 120 may be reduced within a range between about 2 seconds and about 3 seconds.

When providing the service requested by the user as described above, i.e., performing a communication through the AP 120, the mobile device 100 performs a direct connection to the image display apparatus 110. For example, the mobile device 100 may transmit a probe message to the image display apparatus 110 to set a group owner and receive a response to the probe message from the image display apparatus 110. Therefore, the image display apparatus 110 operates as a listener. In more detail, for the direct connection to the image display apparatus 110, the mobile device 100 performs processes, such as a device discovery, a group generation, and a channel negotiation, and additionally performs an IP allocation process. A probe request and a probe response message of an IEEE) 802.11 MAC protocol are exchanged with each other to perform a basic operation of a device discovery process that is performed in a process of generating a Wi-Fi P2P group. The probe request includes WSC IE, Supp Reg IE, etc., and the probe response message includes P2P IE, WSE IE, RSN IE, and Supp Reg IE.

A Wi-Fi P2P function is a technology that is suggested in consideration of compatibility with a general Wi-Fi function, i.e., a legacy Wi-Fi function. Therefore, when using the legacy Wi-Fi function, the user may try a Wi-Fi P2P connection. For example, when the mobile device 100 operates in a legacy Wi-Fi station mode in which the mobile device 100 is connected to the particular AP 120 to be provided with a communication function, the user may request the image display apparatus 110 to execute the Wi-Fi P2P function with the purpose of sharing a file, etc.

If the direct connection is completed, the mobile device 100 performs a handover to directly provide an image signal, which is provided through the AP 120, i.e., video and audio streams, to the image display apparatus 110 through a direct channel. Here, the video and audio may streams both through the AP 120 or through the direct channel simultaneously or in a delayed manner. If the handover is completed, the mobile device 100 stops the communication with the AP 120. As described above, the service that is requested by the user through the direct channel continues so as to provide convenience to the user, and a service quality, such as an image quality, etc., may be improved. For example, if the user executes a particular content through the mobile device 100, the image display apparatus 110 may play the executed content on a screen. Here, an image quality of a content may be higher when the content is provided through the direct channel than when image data is processed through the AP 120. The mobile device 100 may execute various internal functions through the image display apparatus 110, besides the screen mirroring operation.

According to an exemplary embodiment of the present general inventive concept, the image display apparatus 110 may be, for example, a digital television (DTV). The image display apparatus 110 may be connected to the AP 120 to receive a particular broadcast program that is provided from the service providing apparatus 140. The image display apparatus 110 may access the Internet or the like to search for a particular site. Also, when the image display apparatus 110 is connected to the AP 120 through a short-range wireless communication, for example, a Wi-Fi communication, the image display apparatus 110 may execute a request of the mobile device 100 that is provided through a connected channel. For example, if the image display apparatus 110 performs the screen mirroring operation according to the request of the mobile device 100, the image display apparatus 110 may process an image signal provided from the mobile device 100.

When providing such a service, the image display apparatus 110 may respond to a direct connection request requested by the mobile device 100. In other words, for the direct connection to the mobile device 100, the image display apparatus 110 may perform operations, such as a device discovery, a group generation, a channel negotiation, etc., perform a service search in this process, and additionally perform an IP allocation operation. If the operations are completed, the image display apparatus 110 may transmit a response message to the direct connection request in order to complete setting to operate as the listener of the mobile device 100.

The image display apparatus 110 changes a short-range communication module, such as a Wi-Fi communication related to the AP 120, into a Wi-Fi direct module to process the image signal of the mobile device 110 through the Wi-Fi direct module, wherein the image signal has been processed through the short-range communication module. In other words, the image display apparatus 110 changes a processing route of the image signal by the handover of the mobile device 100. Therefore, the image display apparatus 110 may continue the service of the mobile device 100 requested by the user, for example, the screen mirroring operation. If a content of the mobile device 100 is executed by the screen mirroring operation, the image display apparatus 110 displays the executed content on the screen. Based on the above-described contents, the image display apparatus 110 may include a switching unit to change a module.

In the exemplary embodiment of the present general inventive concept described with reference to FIG. 1, the mobile device 100 performs P2P with respect to the image display apparatus 110, i.e., is directly connected to the image display apparatus 110. However, the image display apparatus 110 may operate along with an image receiving apparatus such as a set-top box (STB). In this case, the mobile device 100 may be directly connected to the image receiving apparatus. Therefore, the image display apparatus 100 may perform only a mirroring function or perform only an original function of displaying a particular content played on a screen. Therefore, in the present exemplary embodiment, a target to which the mobile device 100 is directly connected may not be particularly limited to the image display apparatus 110.

The AP 120 includes a small base station such as a femto or pico base station. Here, the femto or pico base station is classified according to the maximum numbers of mobile devices 100 and image display apparatuses 110 that are connected to the AP 120. The AP 120 includes a short-range communication module to perform a short-range communication, such as a Zigbee communication, a Wi-Fi communication, or the like, with the mobile device 100 and the image display apparatus 110. The AP 120 may use a transmission control protocol/Internet protocol (TCP/IP) or a real-time streaming protocol (RTSP) to perform a wireless communication.

In the present exemplary embodiment, the short-range communication may be performed according to various types of standards such as Wi-Fi, Bluetooth, Zigbee, Infrared Data Association (IrDA), a radio frequency (RF) such as a ultrahigh frequency (UHF), a very high frequency (VHF), or the like, an ultraband wideband (UWB), etc. Therefore, the AP 120 may extract a position of a data packet, designates the best communication path in the extracted position, and transmit the data packet to next apparatuses, for example, to the mobile device 100 and the image display apparatus 110, according to the designated communication path. The AP 120 may share several lines in a general network environment, for example, include a router, a repeater, a relay device, etc.

In the present exemplary embodiment, the AP 120 may be a small base station, such as a wireless sharer or the like, that is installed in each home. Although the image display apparatus 110 is connected to the AP 120 at all times or is not connected to the AP 120, the AP 120 may provide a connection status of the image display apparatus 110 or channel information to the mobile device 100 when the mobile device 100 requests a particular service such as a screen mirroring service. Here, the channel information may be included in a beacon signal and then provided. For example, if the image display apparatus 110 is connected to the AP 120 at all times, and the user of the mobile device 100 requests the mirroring service using the image display apparatus 110, the AP 120 performs an operation to provide the mirroring service. If the mobile device 100 changes the handover, i.e., a path to perform a communication, when providing the mirroring service, the AP 120 stops the mirroring service.

The communication network 130 includes wired and wireless communication networks. Here, examples of the wired network include the Internet such as a cable network or a public switched telephone network (PSTN), and examples of the wireless network include a code division multiple access (CDMA), a wideband CDMA (WCDMA), a global system/standard for mobile communication (GSM), an evolved packet core (EPC), a long term evolution (LTE), a wibro network, etc. Therefore, if the communication network 130 is the wired communication network, the AP 120 may access an exchange office of a telephone office or the like. However, if the communication network 130 is the wireless communication network, the AP 120 may access a serving general packet radio service (GPRS) support node (SGSN) or a gateway GPRS support node (GGSN) operated by a communication company to process data or may access various repeaters such as a base station transmission (BTS), NodeB, e-NodeB, etc. to process data. In the present exemplary embodiment, the AP 120 is installed separately from the communication network 130 for convenience of description. However, the AP 120 may be included in the communication network 130.

The service providing apparatus 140 includes a broadcast server that is operated by a broadcasting station. The service providing apparatus 140 may also include a server of an image content provider that provides various types of image contents, besides the broadcasting server. The service providing apparatus 140 provides a content, which is requested by the user, in the mobile device 100 and the image display apparatus 110.

According to an exemplary embodiment of the present general inventive concept, when the user of the mobile device 100 requests the screen mirroring operation of the image display apparatus 110, the image display apparatus 100 starts the screen mirroring service through the AP 120 to which the image display apparatus 110 is connected, to reduce a service opening time. After that, the image display apparatus 110 hands the screen mirroring service over to the direct channel through which the mobile device 100 and the image display apparatus 110 are connected to each other, to continue the screen mirroring service, thereby providing a higher image-quality service to the user.

Figure 2:
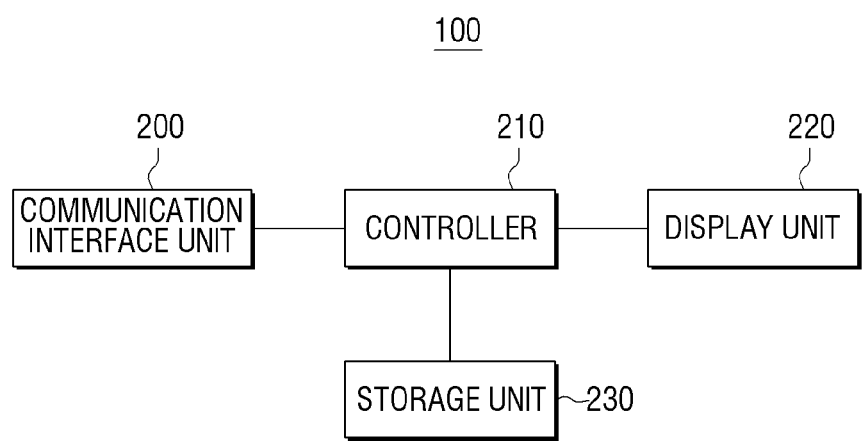
FIG. 2 is a block diagram illustrating a structure of a mobile device of FIG. 1, according to an exemplary embodiment of the present general inventive concept.

FIG. 2 is a block diagram illustrating a structure of the mobile device 100 of FIG. 1, according to an exemplary embodiment of the present general inventive concept.

Referring to FIGS. 1 and 2, the mobile device 100 according to the present exemplary embodiment includes some or all of a communication interface unit 200 (communication interface or communicator), a controller 210, a display unit 220 (display), and a storage unit 230 (storage). The mobile device 110 may further include an information checker (not shown) and a user interface (UI) unit (user interface).

Here, the inclusion of some or all of the above-mentioned components indicates that some components such as the storage unit 230 may be omitted or some components such as the information checker may be integrated with another element such as the controller 210. For sufficient understanding of the present general inventive concept, all of the above-mentioned components will be described as being included.

The communication interface unit 200 may perform a short-range wireless communication, such as Wi-Fi, with the AP 120 and may perform a Wi-Fi P2P communication for a direct connection to the image display apparatus 110. For this, the communication interface unit 200 may include a wireless local area network (WLAN) module and a direct communication module and further include a switching unit that selects at least one of the WLAN module and the direct communication module under control of the controller 210. Each of the WLAN module and the direct communication module stores a protocol or a program to perform an image signal provided to a corresponding module. The communication interface unit 200 according to the present exemplary embodiment may operate the WLAN module to communicate with the AP 120, simultaneously operate the WLAN module and the direct communication module when performing a handover, and after the handover is completed, operate only the direct communication module to directly communicate with the image display apparatus 110.

The communication interface unit 200 may also receive a beacon frame included in a beacon signal from the AP 120 and transmit the beacon frame to the controller 210 or transmit the beacon frame to the information checker under control of the controller 210. The communication interface unit 200 may also transmit a probe request message and receive a response message to the probe request message. Here, the probe request message is generated by a message generator (not shown) for a direct connection to the image display apparatus 110. The communication interface unit 200 may transmit the received response message to the controller 210 or the information checker. The communication interface unit 200 may additionally perform an information conversion operation such as encoding and decoding of particular information or contents.

The controller 210 controls overall operations of internal components such as the communication interface unit 200, the display unit 220, the storage unit 230, etc. For example, if the user requests a service, for example, a screen mirroring service, the controller 210 may check a connection status of the image display apparatus 110 from the beacon frame input through the communication interface unit 200 or check channel information from the beacon frame when the image display apparatus 110 is connected to the mobile device 100. The controller 210 communicates with the image display apparatus 110 through a corresponding channel and the AP 120. For this, the controller 210 may first operate the WLAN module of the communication interface unit 200. When the WLAN module operates, the controller 210 operates the direct communication module of the communication interface unit 200 for a direct connection to the image display apparatus 110. If the direct connection is completed, the controller 210 controls the communication interface unit 200 to perform the handover. In other words, the controller 210 controls to change the WLAN module, through which an image signal is provided to the image display apparatus 100, into a direct channel to continuously transmit the image signal to the image display apparatus 110. The controller 210 may stop an operation of the WLAN module.

Figure 3:
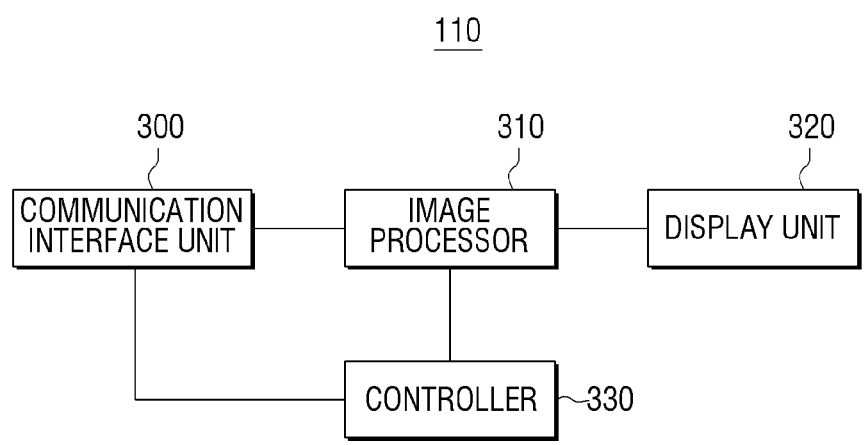
FIG. 3 is a block diagram illustrating a structure of an image display apparatus of FIG. 1, according to an exemplary embodiment of the present general inventive concept.

The controller 210 may include an image processor 310 as shown in FIG. 3. For example, the mobile device 100 may play an image signal provided from the service providing apparatus 140 of FIG. 1, i.e., a multimedia content, and thus the controller 210 may perform basic operations, i.e., may divide the image signal into video and audio signals, decode the video signal, and scale the decoded video signal. Detailed operations of the controller 210 related to image processing are not greatly different from those of the image processor 310 of FIG. 3, and thus descriptions of the detailed operations of the image processor 310 will replace descriptions of the detailed operations of the controller 210.

The storage unit 230 may store a program or an application that is to allow the mobile device 100 to be directly connected to the image display apparatus 100 in order to perform a mirroring operation. The storage unit 230 may also store various types of contents desired by the user. In order to execute such a content, the user may select particular one of contents of the mobile device 100 displayed on the image display apparatus 100 through the mirroring operation. The storage unit 230 may store various types of information and data processed by the mobile device 100 and output the processed information and data under control of the controller 210.

The display unit 220 executes a content and displays the content on a screen under control of the controller 210. Here, if the image display apparatus 110 performs the mirroring operation, the display unit 220 may display the same content as that displayed on the image display apparatus 110, on the screen. The display unit 220 may also receive a user command to control the image display apparatus 110, i.e., a service request. The service request of the user may be performed on the screen of the display unit 220 through a touch screen method. For this, the display unit 220 may include a UI unit.

The information checker may be included as a kind of determiner in the controller 210, check channel information or information about a connection status from a beacon frame transmitted from the controller 210, and informs the controller 210 of the channel information or the information. Therefore, the information checker allows the controller 210 to determine whether the image display apparatus 110 is connected to the AP 120, whether a direct connection operation is completed, etc.

Besides being included in the display unit 220, the UI unit includes a button unit for receiving the service request from the user of the mobile device 100, etc. The user may select a menu item displayed on the screen through a button not by using the touch screen method to provide a service command. Based on this point, when the user selects the service command through a remote controller, the UI unit may receive the service command.

FIG. 3 is a block diagram illustrating a detailed structure of the image display apparatus 110 of FIG. 1, according to an exemplary embodiment of the present general inventive concept.

Referring to FIGS. 1 and 3, the image display apparatus 110 according to the present exemplary embodiment includes a communication interface unit 300 (communication interface), the image processor 310, a display unit 320 (display), and a controller 330. The image display apparatus 110 may further include a storage unit (storage) (not shown), etc. Here, the display unit 320 may operate as one of operation executers. The operation executers refer to various types of function blocks of the image display apparatus 110 such as a sound output unit (sound output), etc.

The communication interface unit 300 includes a WLAN module to perform a WLAN communication, such as Wi-Fi, with the AP 120 and a Wi-Fi direction module to perform a Wi-Fi P2P communication with the mobile device 100. The communication interface unit 300 receives an image signal of the mobile device 100 through a WLAN communication and receives an image signal provided from the mobile device 100 through a P2P communication.

For this, the communication interface unit 300 may share the WLAN module and the Wi-Fi direction module through a physical channel. Therefore, the image display apparatus 110 communicates with the mobile device 100 through a channel connected to the AP 120 through the WLAN module and simultaneously performs a direct connection operation with the mobile device 100 through the Wi-Fi direct module. If the direct connection is completed, the communication interface unit 300 continuously receives an image signal through the Wi-Fi direct module, instead of the WLAN module, according to a handover performance of the mobile device 100. In this process, the image display apparatus 110 may stop an operation of the WLAN module. The image display apparatus 110 may further include a switching unit. The switching unit may be controlled by the controller 330 and select at least one of the WLAN module and the Wi-Fi direct module to receive a service according to a handover of the mobile device 100.

If a broadcast signal is received from the service providing apparatus 140, the image processor 310 may include some or all of a tuner, a demodulator, a demultiplexer, an audio processor, a video processor, etc. The image processor 310 may further include a voice output unit (voice output). The tuner selects a broadcast program selected by the user, the demodulator restores a broadcast signal that is modulated and received, and the demultiplexer separates audio, video, and additional information from the broadcast signal. An audio processor and a video processor may include a decoder and a processor. The decoder decodes encoded data, and the processor scales and controls data.

If the image display apparatus 110 performs a screen mirroring operation of the mobile device 100, the image processor 310 may process an image signal provided from the mobile device 100, i.e., screen data, and a content selected by the user, and output the processed image signal and content to the display unit 320. If the content provided from the mobile device 100 is a HDMI (or a HDMI content) in this case, the image processor 310 may perform only an operation to scale the uncompressed type of corresponding content and output the scaled content.

For example, the image processor 310 processes the image signal of the mobile device 100 through the screen mirroring operation. In other words, before the handover of the mobile device 100, the image processor 310 may process an image signal received through the WLAN module of the communication interface unit 300. However, after the handover, the image processor 310 may process an image signal received through the Wi-Fi direct module of the communication interface unit 300.

The controller 330 may perform a WLAN communication and a communication for a Wi-Fi direct connection according to a request of the mobile device 100. For example, if the mobile device 100 requests a direct connection when performing the WLAN communication with the AP 120, the controller 330 performs a corresponding operation. If a probe request message for the direct connection is received from the mobile device 100 in this process, the controller 330 may control to determine whether the probe request message is received, generate a response message to the probe request message, and transmit the response message through the communication interface unit 300. The response message may be generated by an additional message generator or the controller 330.

After transmitting the response message, if the mobile device 100 informs the image display apparatus 110 that the handover is performed, the controller 300 processes the image signal of the mobile device 100 provided to the WLAN module of the communication interface 300 by using the Wi-Fi direct module. For this, the controller 330 may control the communication interface unit 300.

If the additional information processed by the image processor 310 is stored in an additional storage unit and then displayed on the display unit 320, the controller 330 may control to combine and output the corresponding additional information according to a request of the user or automatically.

The display unit 320 may include a liquid crystal panel or an organic light-emitting diode (OLED) panel. If the image display apparatus 110 is connected to the AP 120 to receive a broadcast program of a particular channel, the display unit 320 may display the corresponding broadcast program. If the user requests performing of the screen mirroring operation of the mobile device 100 in this process, a screen of the mobile device 100 may be displayed on the display unit 320. Also, the display unit 320 displays a content executed in the mobile device 100 according to a request of the user to allow the user to enjoy the content on a larger screen than the mobile device 100.

Figure 4:
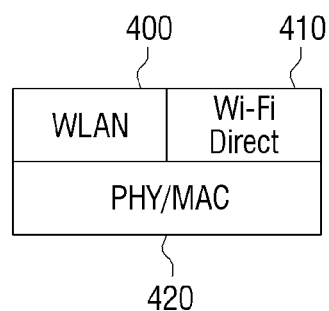
FIG. 4 is a view illustrating a logic layer of a communication interface unit of FIG. 2 or 3, according to an exemplary embodiment of the present general inventive concept.

FIG. 4 is a view illustrating a logic layer of the communication interface unit 200 or 300 (communication interface) of FIG. 2 or 3, according to an exemplary embodiment of the present general inventive concept.

Referring to FIGS. 2, 3, and 4, the mobile device 100 and the image display apparatus 110 according to the present exemplary embodiment may include a WLAN module to perform a WLAN communication with the AP 120 and a Wi-Fi direct module to perform a Wi-Fi direct communication. The WLAN module and the Wi-Fi direct module may be shared through a physical channel.

FIG. 4 illustrates such a physical structure as a logic layer, i.e., illustrates a structure of the communication interface unit 200 or 300 of FIG. 2 or 3. For example, if the image display apparatus 110 is connected to the AP 120 through a PHY/MAC layer 420 on a WLAN layer 400 such as a WLAN module and then is requested through a Wi-Fi direct layer 410 such as a Wi-Fi direct module to be connected to the AP 120 through the same channel, i.e., the PHY/MAC layer 420, direct connection operations for these are simultaneously performed. The WLAN module of the WLAN layer 400 stops an operation thereof after a handover.

Figure 5:
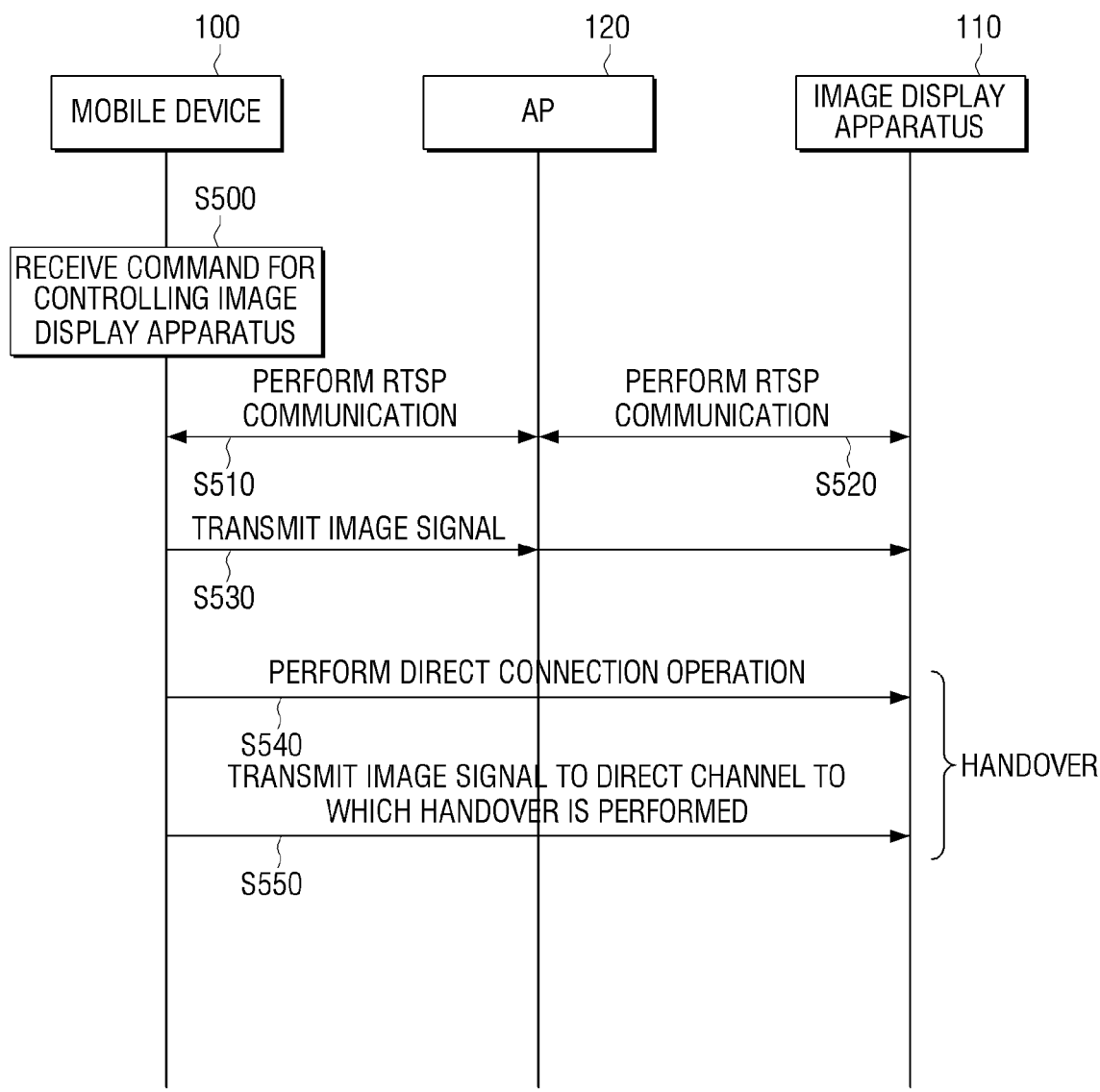
FIG. 5 is a view illustrating a P2P connection process using a handover, according to an exemplary embodiment of the present general inventive concept.

FIG. 5 is a view illustrating a P2P connection process using a handover, according to an exemplary embodiment of the present general inventive concept.

As shown in FIG. 5, the image display apparatus 110 according to the present exemplary embodiment is connected to the AP 120 that is positioned around the image display apparatus 100 like a wireless sharer installed in a home. The AP 120 may be connected to the image display apparatus 100 that is turned on, at all times or only when there is a request of the user.

When the image display apparatus 110 is connected to the AP 120 as described above, the mobile device 100 receives a command to control the image display apparatus 110 from the user in operation S500. Here, the command to control the image display apparatus 110 includes a command that instructs the image display apparatus 110 to perform a screen mirroring operation of the mobile device 100.

If the command is received, the mobile device 100 performs an RTSP communication with the AP 120 according to a preset method in operation S510. The mobile device 100 may provide a service through a direct connection to the image display apparatus 110 according to a request of the user. However, the mobile device 100 first checks whether the image display apparatus 110 is connected to the AP 120 in order to provide a fast service to the user.

If an RTSP message is provided to the AP 120 in this process, the AP 120 transmits the RTSP message to the image display apparatus 110. For this, the AP 120 and the image display apparatus 110 perform an RTSP communication in operation S520.

The mobile device 100 checks a channel, to which the image display apparatus 110 is currently connected, through a communication with the AP 120 and executes a service through the corresponding channel according to a request of the user in operation S530. In other words, the mobile device 100 transmits an image signal related to the service to the image display apparatus 110. For example, if the user requests the screen mirroring operation, the mobile device 100 may transmit an image signal of a content executed by the user to the image display apparatus 110. The screen mirroring operation refers to a function of displaying an image of the mobile device 100 to the image display apparatus 110.

In operation S540, the mobile device 100 performs a direct connection operation with the image display apparatus 110 when the service is executed through the AP 120. Although there is no request of the user, the direct connection operation may be automatically performed according to an initial setting.

If the direct connection operation is completed, the mobile device 100 performs a handover to a direct channel to continuously provide the service that is provided through the AP 120, in operation S550.

In the present exemplary embodiment, as a result of the above-described operation, a start time of a service according to a request of a user may be reduced to increase convenience of the user. Also, if several seconds elapses after the service starts, the service may be provided through a direct channel to which a handover is performed, to improve a quality of the service such as an image quality or the like.

Figure 6:
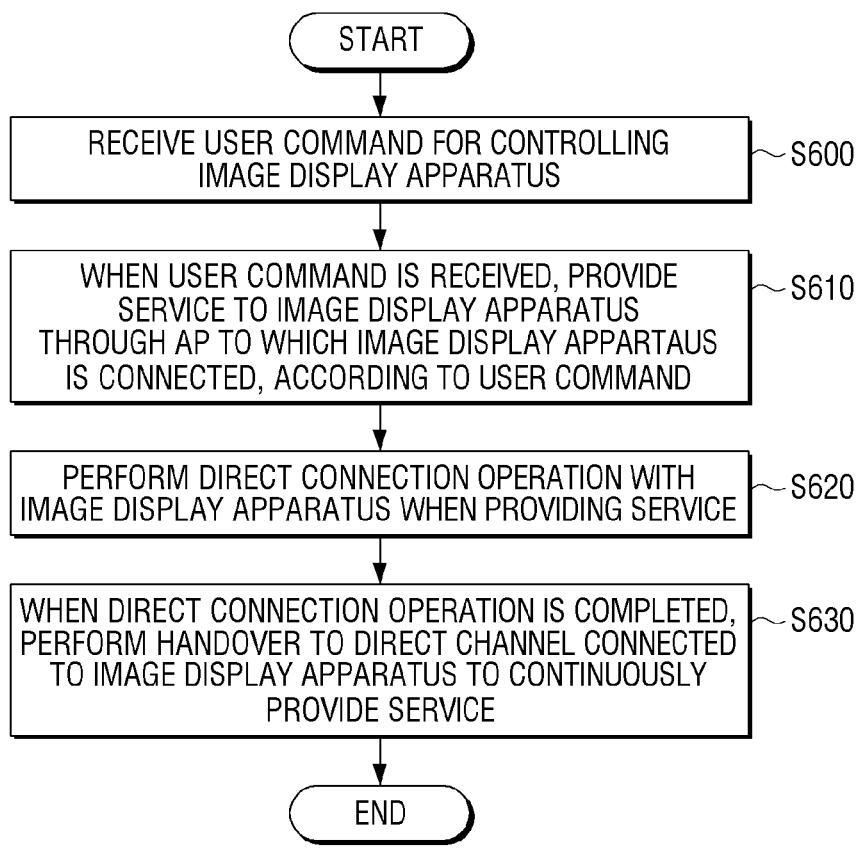
FIG. 6 is a flowchart of a method of controlling a mobile device, according to an exemplary embodiment of the present general inventive concept.

FIG. 6 is a flowchart of a method of controlling the mobile device 100, according to an exemplary embodiment of the present general inventive concept.

Referring to FIGS. 1 and 6 for convenience of description, in operation S600, the mobile device 100 receives a user command to control image display apparatus 110, such as a mirroring service, from a user.

In operation S610, the mobile device 100 provides a service to the image display apparatus 110 through the AP 120, to which the image display apparatus 110 is connected, according to the user command. For example, the mobile device 100 may start the mirroring service requested by the user. Prior to providing of a service, the mobile device 100 may determine whether the image display apparatus 110 is connected to the AP 120. If it is determined that the image display apparatus 110 is connected to AP, the mobile device may check connection information such as channel information between the image display apparatus 110 and the AP 120. For example, since the image display apparatus 110 is connected to the AP 120 at all times in a home, the mobile device 100 may check only channel information in this case.

In operation S620, the mobile device 100 performs a direct connection operation with the image display apparatus 110 when providing the service. In other words, the mobile device 100 may perform a device discovery, a group generation, and a channel negotiation and may additionally perform a service search and an IP allocation process.

If the direct connection operation is completed, the mobile device 100 performs a handover to a direct channel connected to the image display apparatus 110 to continuously provide the service in operation S630. A service operation of the AP 120 is ended by the handover.

Figure 7:
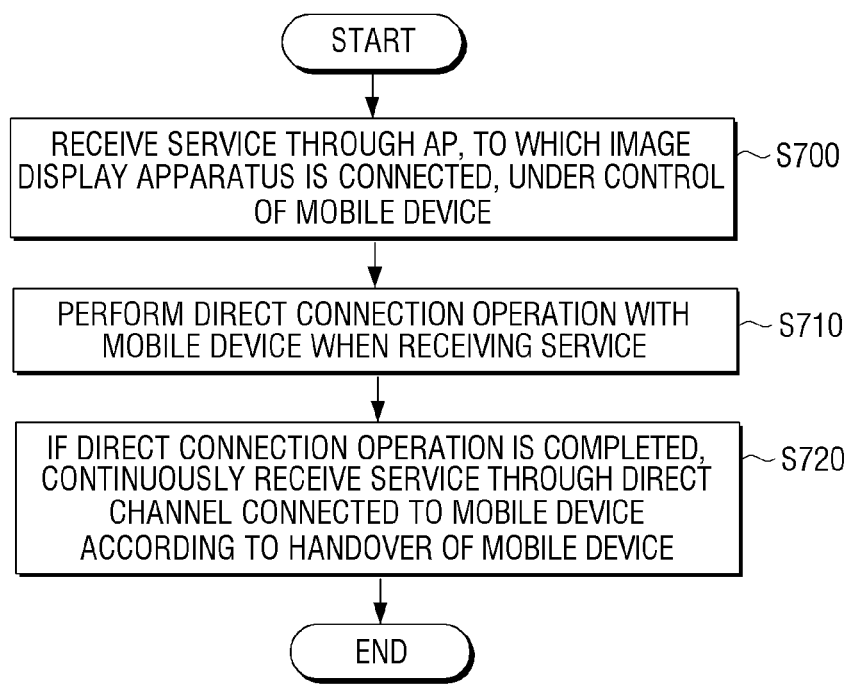
FIG. 7 is a flowchart of a method of controlling an image display apparatus, according to an exemplary embodiment of the present general inventive concept.

FIG. 7 is a flowchart of a method of controlling the image display apparatus 110, according to an exemplary embodiment of the present general inventive concept.

Referring to FIGS. 1 and 7 for convenience of description, the image display apparatus 110 according to the present exemplary embodiment receives a service through the AP 120, to which the image display apparatus 110 is connected, under control of the mobile device 100 in operation S700. In other words, the image display apparatus 110 may receive an image signal related to the service.

In operation S710, the image display apparatus 110 performs a direct connection operation according to a request of the mobile device 100 when receiving the service. In other words, if the user requests a mirroring service to control the image display apparatus 110, the mobile device 100 may provide an image signal to the AP 120 to execute the service according to a preset method and then automatically perform a direct connection.

If the direct connection operation is completed, the image display apparatus 110 continuously receives a service through a direct channel connected to the mobile device 100 according to a handover of the mobile device 100 in operation S720. In this process, the image display apparatus 110 stops the service that is provided through the AP 120.

A mobile device which controls an image display apparatus may include a user interface configured to receive a user input to control the image display apparatus, a communication interface configured to provide a service according to the user input via an indirect connection to the image display apparatus, and to establish a direct connection with the image display apparatus when the service is provided and a controller configured to control the communication interface to switch over the service to the direct connection to continuously provide the service to the image display apparatus when the direct connection is established. The indirect connection may be established through an access point and the service may include a screen mirroring between the mobile device and the image display apparatus. When the switch over is completed, the controller may control the communication interface to disconnect the indirect connection.

A method of controlling a mobile device which controls an image display apparatus may include receiving a user input to control the image display apparatus, providing a service to the image display apparatus via an indirect connection according to the user input, establishing a direct connection with the image display apparatus when the service is provided and performing a switch over to the direct connection to continuously provide the service to the image display apparatus when the direct connection is established. The indirect connection may be established through an access point and the providing of the service may be performed through the access point. The providing of the service may include providing a screen mirroring between the mobile device and the image display apparatus. The method may further comprises disconnecting the indirect connection when the switch over is completed.

Although all of components constituting an exemplary embodiment of the present general inventive concept are combined into one or combined to operate, the present general inventive concept is not necessarily limited to the exemplary embodiment. In other words, all components may be selectively combined into one or more to operate within the scope of the present general inventive concept. Also, each of the components may be embodied as one piece of independent hardware, but some or all of the components may be selectively combined to be embodied as a computer program having a program module performing some or all of functions that are combined in one piece of hardware or a plurality of pieces of hardware. Codes and code segments constituting the computer program may be easily inferred by those skilled in the art. The computer program may be stored on a non-transitory computer-readable medium, and read and executed by a computer in order to embody the exemplary embodiment of the present general inventive concept.

The embodiments of the disclosure may be written as one or more computer programs and may be implemented in general-use digital computers that execute the programs using a computer readable recording medium (e.g., a non-transitory computer readable recording medium). Examples of the computer readable recording medium include magnetic storage media (e.g., ROM, floppy disks, hard disks, etc.), optical recording media (e.g., CD-ROMs, DVDs or Blu-rays), a universal serial bus (USB) drive, a memory card, and etc. The non-transitory computer-readable media may include program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

The foregoing exemplary embodiments and advantages are merely exemplary and are not to be construed as limiting. The present teaching may be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A mobile device to control an image display apparatus, the mobile device comprising:
   a display;
   at least one memory storing instructions; and
   at least one processor that executes the instructions to cause the following:
      establishing a communication with the image display apparatus through an access point (AP);
      in response to a user input to display an image content on the image display apparatus before a direct connection with the image display apparatus via a peer to peer-type communication is established, providing data corresponding to the image content to the image display apparatus using the communication established with the image display apparatus through the AP;
      performing an operation of a device discovery for the direct connection with the image display apparatus during a time in which the data corresponding to the image content is being provided to the image display apparatus through the AP;
      performing a handover in which a processing route of the data corresponding to the image content is changed to a direct channel established between the mobile device and the image display apparatus subsequent to completion of the operation of the device discovery;
      controlling the display to display the image content while providing the data corresponding to the image content to the image display apparatus such that the image content currently displayed on the display is mirrored on the image display apparatus; and wherein the operation of the device discovery occurs prior to stopping of the data corresponding to the image content from being continued through the AP.

2. The mobile device of claim 1, wherein the establishing of the communication with the image display apparatus through the AP includes establishing a Wireless Local Area Network (WLAN) communication with the AP, and wherein the performing of the operation related to the direct connection includes performing a wireless direct communication with the image display apparatus.

3. The mobile device of claim 2, wherein the at least one processor that executes the instructions to further cause the following to be performed:

selecting the WLAN communication with the AP or the wireless direct communication with the image display apparatus.

4. The mobile device of claim 1, wherein the performing of the handover by the at least one processor enables an image signal to be directly provided to the image display apparatus through the direct channel.

5. An image display apparatus controlled by a mobile device, the image display apparatus comprising:

a display;

at least one memory storing instructions; and at least one processor that executes the instructions to cause the following:

establishing a communication with the mobile device through an access point (AP);

in response to a user input to display an image content on the image display apparatus before a direct connection with the mobile device via a peer to peer-type communication is established, receiving data corresponding to the image content from the mobile device through the AP using the communication established with the image display apparatus;

performing an operation of a device discovery for the direct connection with the mobile device during a time in which the receiving of the data corresponding to the image content is being continued through the AP;

receiving the data corresponding to the image content through a direct channel established with the mobile device according to a handover of the mobile device in which a processing route of the data corresponding to the image content is changed to the direct channel subsequent to completion of the operation of the device discovery, controlling the display to display the content image, wherein the image content currently displayed on the display is mirrored with the image content displayed on the mobile device, and wherein the operation of the device discovery occurs prior to stopping of the data corresponding to the image content from being continued through the AP.

6. The image display apparatus of claim 5, wherein the establishing of the communication with the image display apparatus through the AP includes establishing performing a Wireless Local Area Network (WLAN) communication with the AP, and wherein the performing of the operation related to the direct connection includes performing a wireless direct communication with the mobile device.

7. The image display apparatus of claim 5, wherein the at least one processor that executes the instructions to further cause the following to be performed:

selecting the WLAN communication with the AP or the wireless direct communication with the image display apparatus.

8. A method of controlling a mobile device which controls an image display apparatus, the method comprising:

by at least one processor executing instructions stored in at least one memory, establishing a communication with the image display apparatus through an access point (AP);

in response to a user input to display an image content on the image display apparatus before a direct connection with the image display apparatus via a peer to peer-type communication is established, providing data corresponding to the image content to the image display apparatus using the communication established with the image display apparatus through the AP;

performing an operation of a device discovery for the direct connection with the image display apparatus during a time in which the data corresponding to the image content is being provided through the AP;

performing a handover in which a processing route of the data corresponding to the image content is changed to a direct channel established between the mobile device and the image display apparatus subsequent to completion of the operation of the device discovery; and displaying the image content image while providing the data corresponding to the image content to the image display apparatus such that the image content currently displayed on the mobile device is mirrored on the image display apparatus, wherein the operation of the device discovery occurs prior to stopping of the data corresponding to the image content from being continued through the AP.

9. The method of claim 8, wherein the establishing of the communication with the image display apparatus through the AP includes establishing a Wireless Local Area Network (WLAN) communication with the mobile device and the image display apparatus, and wherein the performing of the operation related to the direct connection includes performing a wireless direct communication with the image display apparatus.

10. The method of claim 8, wherein the providing of the data corresponding to the image content to the image display apparatus comprises:

performing the communication with the AP to determine whether the image display apparatus is connected to the AP, wherein the data corresponding to the image content is provided according to a result of the determination.

11. The method of claim 8, wherein the performing of the handover enables an image signal to be directly provided to the image display apparatus through the direct channel.

12. A method of controlling an image display apparatus by a mobile device, the method comprising:

by at least one processor executing instructions stored in at least one memory, establishing a communication with the mobile device through an access point (AP);

in response to a user input to display an image content on the image display apparatus before a direct connection with the image display apparatus via a peer to peer-type communication is established, receiving data corresponding to the image content from the mobile device through the AP using the communication established with the image display apparatus;

performing an operation of a device discovery for the direct connection with the mobile device during a time in which the receiving of the data corresponding to the image content from the mobile device through the AP is being continued; and receiving the data corresponding to the image content through a direct channel established with the mobile device according to a handover in which a processing route of the data corresponding to the image content is changed to the direct channel subsequent to completion of the operation of the device discovery, and controlling displaying of the image content, wherein the image content currently displayed on the image display apparatus is mirrored with the image content displayed on the mobile device, wherein the operation of the device discovery occurs prior to stopping of the data corresponding to the image content from being continued through the AP.

13. The method of claim 12, wherein the establishing of the communication with the image display apparatus through the AP includes establishing a Wireless Local Area Network (WLAN) communication with the mobile device and the image display apparatus, and wherein the performing of the operation related to the direct connection includes performing a wireless direct communication with the mobile device.

* * * * *